US012670851B2

(12) United States Patent
Han

(10) Patent No.: US 12,670,851 B2
(45) Date of Patent: Jun. 30, 2026

(54) MICRO LED DISPLAY DEVICE AND A METHOD FOR OPERATING THE SAME

(71) Applicant: LG Display Co., Ltd., Seoul (KR)

(72) Inventor: Sangwoo Han, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/046,078

(22) Filed: Feb. 5, 2025

(65) Prior Publication Data

US 2025/0265974 A1 Aug. 21, 2025

(30) Foreign Application Priority Data

Feb. 16, 2024 (KR) ........................ 10-2024-0022915

(51) Int. Cl.

| | |
|---|---|
| ***G09G 3/32*** | (2016.01) |
| ***G09G 3/3225*** | (2016.01) |
| ***G09G 3/3233*** | (2016.01) |
| ***G09G 3/3258*** | (2016.01) |

(52) U.S. Cl.

CPC ............. *G09G 3/32* (2013.01); *G09G 3/3225* (2013.01); *G09G 3/3233* (2013.01); *G09G 3/3258* (2013.01); *G09G 2300/0426* (2013.01); *G09G 2300/0861* (2013.01); *G09G 2310/08* (2013.01); *G09G 2320/0295* (2013.01); *G09G 2320/045* (2013.01); *G09G 2330/021* (2013.01)

(58) Field of Classification Search

CPC .... G09G 3/3233; G09G 2310/08; G09G 3/32; G09G 2300/0426; G09G 2320/045; G09G 3/2088; G09G 3/3258; G09G 3/3225; G09G 2320/0233; G09G 2320/0295; G09G 2300/0861

See application file for complete search history.

(56) References Cited

U.S. PATENT DOCUMENTS

| | | | | |
|---|---|---|---|---|
| 8,710,753 | B2 | 4/2014 | Kim et al. | |
| 9,161,402 | B2 | 10/2015 | Kim et al. | |
| 11,568,816 | B1 * | 1/2023 | Ahn | G02B 27/0172 |
| 2012/0169704 | A1 * | 7/2012 | Chung | G09G 3/3233 345/212 |
| 2013/0147374 | A1 | 6/2013 | Kim et al. | |
| 2014/0210365 | A1 | 7/2014 | Kim et al. | |

(Continued)

FOREIGN PATENT DOCUMENTS

KR 10-2013-0064017 A 6/2013

*Primary Examiner* — Dismery Mercedes
(74) *Attorney, Agent, or Firm* — Fenwick & West LLP

(57) ABSTRACT

Disclosed are a micro-LED display device capable of compensating for a difference between currents of pixels. The micro-LED display device includes a display panel including a plurality of pixel areas and a driver disposed in each of the pixel areas to control an operation of a plurality of pixels disposed in each of the pixel areas; and a timing controller configured to control an operation of the driver disposed in each of the pixel areas, wherein the driver comprises: a sensor for detecting current output through a LED in a first pixel of the plurality of pixels and converting the detected current into a voltage; and a converter for converting the converted voltage into a digital voltage, wherein the driver is configured to control ON/OFF of at least one driving transistor among the plurality of driving transistors disposed in the first pixel, based on the converted digital voltage.

9 Claims, 6 Drawing Sheets

(56) References Cited

U.S. PATENT DOCUMENTS

| | | | | |
|---|---|---|---|---|
| 2016/0012799 | A1* | 1/2016 | Kim | G09G 3/3233 345/82 |
| 2018/0083078 | A1* | 3/2018 | Park | H10D 64/311 |
| 2018/0130419 | A1* | 5/2018 | He | G09G 3/3233 |
| 2019/0384445 | A1* | 12/2019 | Huang | G06F 3/0412 |
| 2020/0051482 | A1* | 2/2020 | Cok | G09G 3/006 |
| 2020/0193902 | A1* | 6/2020 | Hsu | G09G 3/3406 |
| 2020/0302860 | A1* | 9/2020 | Kim | G09G 3/325 |
| 2021/0074222 | A1* | 3/2021 | Meng | G09G 3/3275 |
| 2021/0287609 | A1* | 9/2021 | An | G09G 3/3266 |
| 2022/0172672 | A1* | 6/2022 | Park | G09G 3/32 |
| 2022/0238065 | A1* | 7/2022 | Liu | G09G 3/3233 |
| 2022/0415247 | A1* | 12/2022 | Liao | G09G 3/32 |
| 2023/0154400 | A1* | 5/2023 | Yin | G09G 3/3233 345/204 |
| 2023/0368708 | A1* | 11/2023 | Furukawa | G09G 3/006 |

* cited by examiner

MICRO LED DISPLAY DEVICE AND A METHOD FOR OPERATING THE SAME

CROSS-REFERENCE TO RELATED APPLICATION

This application claims priority from Republic of Korea Patent Application No. 10-2024-0022915 filed on Feb. 16, 2024, which is hereby incorporated by reference in its entirety.

BACKGROUND

Field

The present disclosure relates to a micro-LED display device and a method for operating the same, and more specifically, to a micro-LED display device configured to compensate for a difference between current of pixels and a method for operating the same.

Description of Related Art

The most widely developed display devices recently include liquid crystal displays (LCDs), organic light-emitting diode (OLED) displays, and quantum dot light-emitting diode (QLED) displays.

In this regard, in the liquid crystal display device, there is no self-light-emitting means in a display panel thereof. Accordingly, in the liquid crystal display device, a separate backlight that supplies light to the display panel should be provided. In this regard, a nitride-based light-emitting diode (LED) is mainly used as a light source of the backlight.

On the other hand, the OLED display device and the QLED display device has an OLED and a QLED that emit light on its own, respectively, and thus does not require a separate backlight, and thus has the advantages of fast response speed, high luminous efficiency, wide viewing angle, and great luminance.

A micro-LED generally refers to an LED having one side of a size of 100 μm or smaller. This size corresponds to about 1/10 or smaller of a size of a general LED. The micro-LED is known to have energy efficiency greater by about 20% than that of the general LED. Due to a small size thereof, the micro-LED has the advantages of low heat generation and low power consumption. Due to these advantages, many studies are being conducted to apply the micro-LED to the display device.

SUMMARY

The micro-LED display device compensates for a difference between respective currents of pixels in a diode connection scheme. However, this scheme has a problem in that it is difficult to accurately compensate for the difference when the display device operates at a level (e.g., low gray level) at which the driving transistor operates in a subthreshold region. Therefore, the inventors of the present disclosure have invented a micro-LED display device capable of compensating for the difference between currents of the driving transistors in the micro-LED display device.

A purpose to be achieved according to one embodiment of the present disclosure is to provide a driver capable of compensating for the difference between currents of the driving transistors in each pixel of the micro-LED display device.

Furthermore, a purpose to be achieved according to one embodiment of the present disclosure is to provide a micro-LED display device and a method for operating the same, capable of compensating for the difference between currents of the driving transistors in each pixel of the micro-LED display device.

In addition, a purpose to be achieved according to one embodiment of the present disclosure is to provide a micro-LED display device and a method for operating the same, capable of compensating for the difference between the mobilities of the driving transistors of each pixel.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

An embodiment of the disclosure relates to a micro-LED display device comprising: a display panel including a plurality of pixel areas, wherein the display panel comprises a driver disposed in each of the pixel areas to control an operation of a plurality of pixels disposed in each of the pixel areas; and a timing controller configured to control an operation of the driver disposed in each of the pixel areas, wherein the driver comprises: a sensor for detecting current output through a LED in a first pixel of the plurality of pixels and converting the detected current into a voltage; and a converter for converting the converted voltage into a digital voltage, wherein the driver is configured to control ON/OFF of at least one driving transistor among a plurality of driving transistors disposed in the first pixel, based on the converted digital voltage.

Another embodiment of the disclosure relates to a method for operating a micro-LED display device, wherein the micro-LED display device comprises: a display panel including a plurality of pixel areas, wherein the display panel comprises a driver disposed in each of the pixel areas to control an operation of a plurality of pixels disposed in each of the pixel areas; and a timing controller configured to control an operation of the driver disposed in each of the pixel areas, wherein the method comprises: detecting a current output through an LED in a first pixel and converting the detected current into a voltage; converting the converted voltage into a digital voltage; and controlling ON/OFF of at least one driving transistor among a plurality of driving transistors disposed in the first pixel, based on the converted digital voltage.

The micro-LED display device according to one embodiment of the present disclosure includes a driver provided in each of a plurality of pixel areas.

Further, the micro-LED display device according to one embodiment of the present disclosure includes a driver disposed in each of the pixel areas and configured to control an operation of a plurality of pixels disposed in each pixel area.

Furthermore, the micro-LED display device according to an embodiment of the present disclosure includes a driver that is configured to control ON/OFF of a plurality of driving transistors disposed in a sub-pixel within each pixel.

Furthermore, the micro-LED display device according to an embodiment of the present disclosure includes a driver that compensates for a difference between a current of a driving transistor of a sub-pixel corresponding to the driver and a current of a driving transistor of a sub-pixel adjacent thereto.

In the micro-LED display device according to an embodiment of the present disclosure, the driver is disposed in each pixel area and compensates for the difference between the respective currents of the pixel.

Furthermore, the driver according to an embodiment of the present disclosure compensates for a difference between the respective currents of the pixels, based on a difference between the mobilities of the driving transistors of each pixel.

Furthermore, the micro-LED display device according to an embodiment of the present disclosure provides an effect of reducing power consumption of the micro-LED display device by compensating for the difference between the currents of the driving transistors of each pixel.

The effects of the present disclosure are not limited to the effects mentioned above, and other effects not mentioned will be clearly understood by those skilled in the art from the description below.

DETAILED DESCRIPTION

Figure 1:
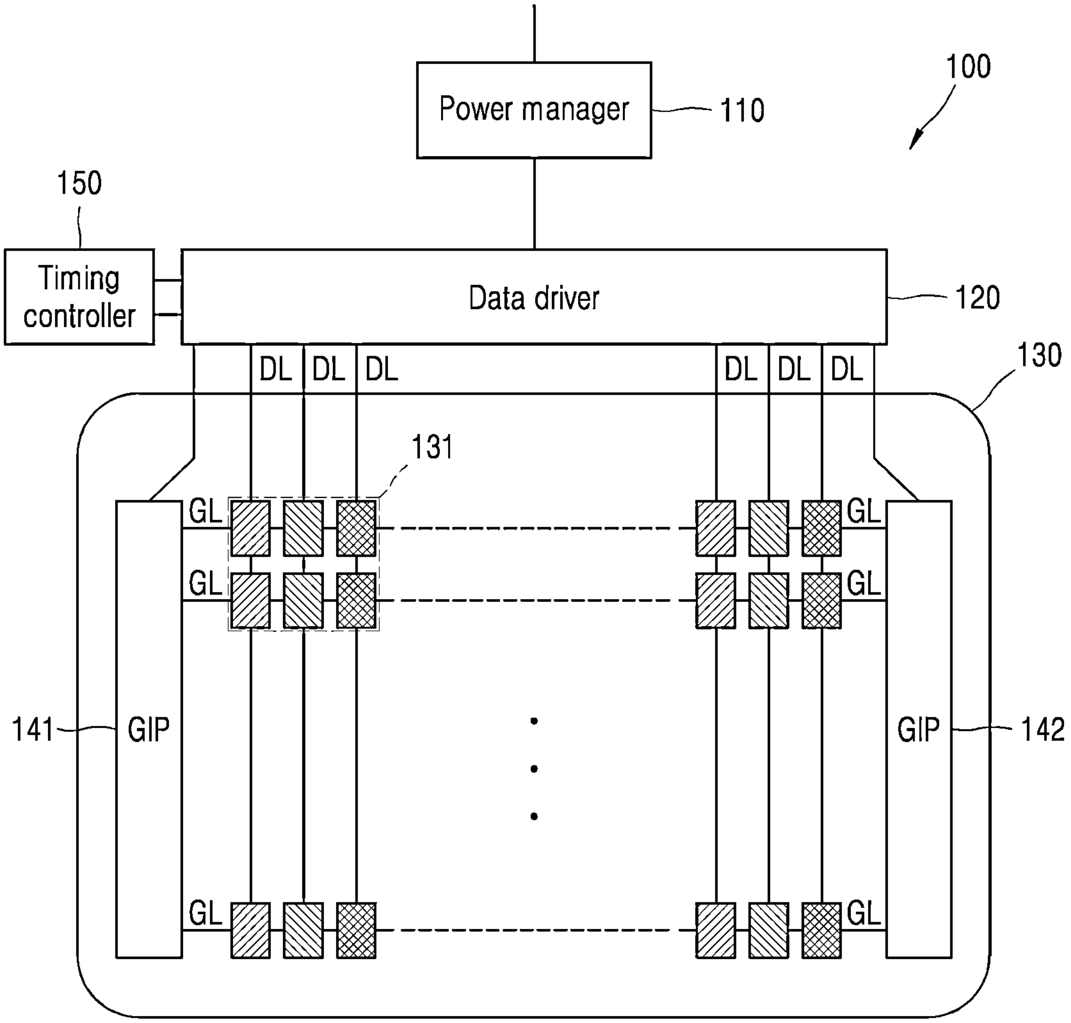
FIG. 1 is a block diagram of a display device according to an embodiment of the present disclosure.

Advantages and features of the present disclosure, and a method of achieving the advantages and features will become apparent with reference to embodiments described below in detail together with the accompanying drawings. However, the present disclosure is not limited to the embodiments as disclosed under, but may be implemented in various different forms. Thus, these embodiments are set forth only to make the present disclosure complete, and to entirely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items.

Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element or layer may be disposed directly on the second element or layer or may be disposed indirectly on the second element or layer with a third element or layer being disposed between the first and second elements or layers. It will be understood that when a first element or layer is referred to as being "connected to", or "coupled to" a second element or layer, the first element or layer may be directly connected to or coupled to the second element or layer, or one or more intervening elements or layers may be present therebetween. In addition, it will also be understood that when an element or layer is referred to as being "between" two elements or layers, it may be the only element or layer between the two elements or layers, or one or more intervening elements or layers may also be present therebetween.

In descriptions of temporal relationships, for example, temporal precedent relationships between two events such as "after", "subsequent to", "before", etc., another event may occur therebetween unless "directly after", "directly subsequent" or "directly before" is indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or periods, these elements, components, regions, layers and/or periods should not be limited by these terms. These terms are used to distinguish one element, component, region, layer or section from another element, component, region, layer or section. Thus, a first element, component, region, layer or section as described under could be termed a second element, component, region, layer or section, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other or may be implemented together in an association relationship.

In interpreting a numerical value, the value is interpreted as including an error range unless there is a separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects," and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description as set forth below have been selected as being general and universal in the related technical field. However, there may be other terms than the terms depending on the development and/or change of technology, convention, preference of technicians, etc. Therefore, the terms used in the description as set forth below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description as set forth below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Throughout the present disclosure, "A and/or B" means A, B, or A and B, unless otherwise specified, and "C to D" means C inclusive to D inclusive unless otherwise specified.

Hereinafter, a display device according to each of embodiments of the present disclosure is described with reference to the attached drawings. In describing an embodiment, descriptions of components in a corresponding embodiment identical with or similar to those of previous embodiments will be omitted.

FIG. 1 is a block diagram of a display device according to one embodiment of the present disclosure.

Referring to FIG. 1, a display device 100 according to an embodiment of the present disclosure may include a display panel 130 including a plurality of pixels 131, a gate driver 141 and 142 that supplies a gate signal to the display panel 130, a data driver 120 that supplies a data signal to the display panel 130, and a power manager 110 that supplies power required for driving the display panel 130. Furthermore, the display device 100 may include a timing controller 150.

A configuration of the display device 100 as illustrated in FIG. 1 is based on one embodiment. Thus, the components of the display device 100 are not limited to the embodiment illustrated in FIG. 1, and some components may be added thereto, changed, or deleted therefrom as needed.

According to one embodiment, the display panel 130 may include a display area in which pixels are arranged to display an image, and a non-display area which surrounds the display area and in which at least one of the gate driver 141 and 142 and the data driver 120 is disposed.

According to one embodiment, in the display panel 130, a plurality of gate lines GL and a plurality of data lines DL intersect each other, and each of the plurality of pixels is connected to the gate line GL and the data line DL. Specifically, one pixel may receive a gate signal from the gate driver 141 and 142 through the gate line GL, receive a data signal from the data driver 120 through the data line DL, and receive a high-potential driving voltage VDD and a low-potential driving voltage from the power manager 110.

According to one embodiment, the gate line GL may supply a scan signal and a light emission control signal, and the data line DL may supply a data voltage VDATA. Furthermore, according to various embodiments, the gate line GL may include a plurality of scan lines supplying the scan signal and the light emission control signal line supplying the light emission control signal. Furthermore, each of the plurality of pixels may additionally include a power line and may receive a bias voltage, an anode reset voltage, and an initialization voltage through the power line.

Each of the pixels may include a plurality of sub-pixels for emitting light of colors. The sub-pixels may include a red pixel, a green pixel, and a blue pixel. Furthermore, the sub-pixels may further include a white sub-pixel. Each of the sub-pixels may include a pixel circuit.

According to one embodiment, the timing controller 150 may process image data RGB input from an external source so as to be adapted to a size and a resolution of the display panel 130 and supply the processed image data to the data driver 120. The timing controller 150 may generate a gate control signal and a data control signal based on synchronization signals input thereto from an external source, for example, a dot clock signal, a data enable signal, a horizontal synchronization signal, and a vertical synchronization signal. The timing controller 150 may control the gate driver 141 and 142 and the data driver 120 by supplying the generated gate control signal and the generated data control signal to the gate driver 141 and 142 and the data driver 120, respectively.

According to one embodiment, the timing controller 150 may generate the gate control signal for controlling an operation timing of the gate driver 141 and 142 and the data control signal for controlling an operation timing of the data driver 120, based on a timing signal.

According to one embodiment, the gate driver 141 and 142 may supply the scan signal through the gate line GL to the display panel 130 based on the gate control signal supplied from the timing controller 150. The gate driver 141 and 142 may be disposed in one side or both opposing sides of the display panel 130 in a GIP (Gate In Panel) scheme.

According to one embodiment, the gate driver 141 and 142 may sequentially output the gate signal to the plurality of gate lines GL under the control of the timing controller 150. The gate driver 141 and 142 may sequentially supply the signals to the gate lines GL by shifting the gate signal using a shift register.

The gate signal may include the scan signal and the light emission control signal. The scan signal may include a scan pulse that swings between a gate on voltage and a gate off voltage. The light emission control signal may include a light emission control signal pulse that swings between a gate-on voltage and a gate-off voltage.

The scan pulse selects pixels of a row to which data is to be written in synchronization with the data voltage VDATA. The light emission control signal defines an emission time of the pixels.

According to one embodiment, the gate driver 141 and 142 may provide the light emission control signal and/or the scan signal to the display panel 130.

According to one embodiment, the data driver 120 may convert the image data RGB into the data voltage VDATA based on the data control signal supplied from the timing controller 150 and supply the converted data voltage to the pixel through the data line DL.

According to one embodiment, the power manager 110 generates a direct current (DC) power required for driving the display panel 130 using a DC-DC converter. The power manager 110 may receive a DC input voltage applied from a host system (not shown) and generate DC voltages such as a gate-on voltage, a gate-off voltage, a high-potential driving voltage, and a low-potential driving voltage using the received DC input voltage. The gate-on voltage and the gate-off voltage are supplied to the level shifter (not shown) and the gate driver 141 and 142. The high-potential driving voltage and the low-potential driving voltage are supplied in common to the pixels.

Figure 2:
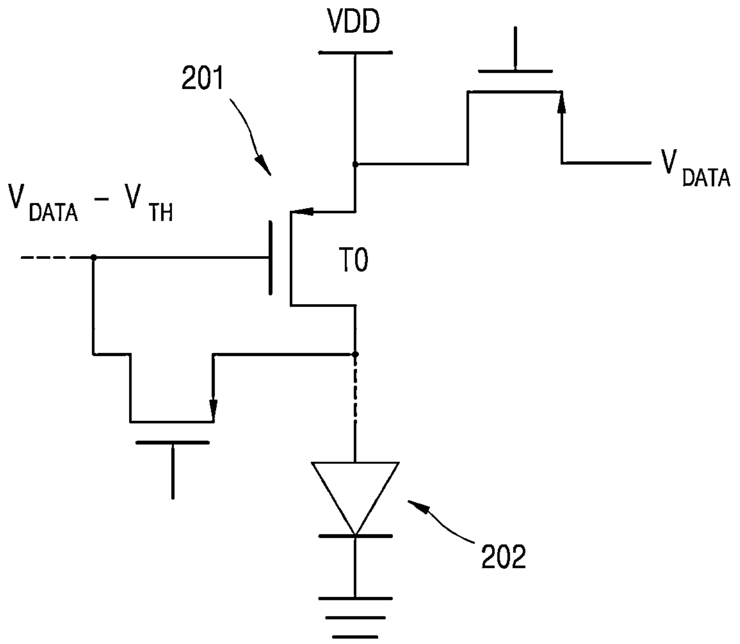
FIG. 2 is a schematic diagram showing a sub-pixel circuit configuration of a display device according to an embodiment of the present disclosure.

FIG. 2 is a schematic diagram showing a sub-pixel circuit configuration of a display device according to an embodiment of the present disclosure.

Referring to FIG. 1 and FIG. 2, each of the sub-pixel circuits arranged in the display panel 130 includes a driving transistor 201 which may also be referred to as a driving transistor TO for the convenience of the following description.

According to one embodiment, each sub-pixel may include the driving transistor 201 connected to the gate line GL, the data line DL, the initialization power line, the light emission control line, a high-potential voltage source, and an LED 202 connected to and disposed between the driving transistor 201 and a low-potential voltage source. The LED 202 is equivalently expressed as a diode.

Furthermore, each sub-pixel may include a plurality of switching transistors and a storage capacitor.

According to one embodiment, the driving transistor 201 is turned ON based on the data signal applied to the gate electrode, and as a result, a current proportional to the data signal flows through the driving transistor 201 to the LED 202. Thus, the LED 202 emits light at a luminance level proportional to the current flowing through the driving transistor 201.

In this regard, the current I to flowing through the driving transistor 201 may be calculated based on a following [Mathematical Formula 1]:

$$I_{to} = k \times \mu \times (VGS - VDD)^2 \quad \text{[Mathematical Formula 1]}$$

In [Mathematical Formula 1], k represents a constant value, μ represents the mobility of the driving transistor 201, VGS represents a voltage between a gate terminal and a source terminal of the driving transistor 201, and VDD represents the input voltage thereto.

The display device 100 according to the present disclosure may compensate for the difference between the respective currents of the pixels by offsetting the threshold voltage VTH of the driving transistor. However, in this scheme, it may be difficult to accurately compensate for the difference when the display device operates at a level (e.g., low gray level) at which the driving transistor operates in a subthreshold region. Furthermore, it may be difficult to compensate a current based on for a difference between mobilities of the driving transistors of the pixels.

To this end, the display device according to the present disclosure may be configured such that a plurality of driving transistors are disposed in each pixel, and the ON/OFF of at least one driving transistor among the plurality of driving transistors is controlled based on a detecting result of the current flowing to the LED of each pixel.

Figure 3:
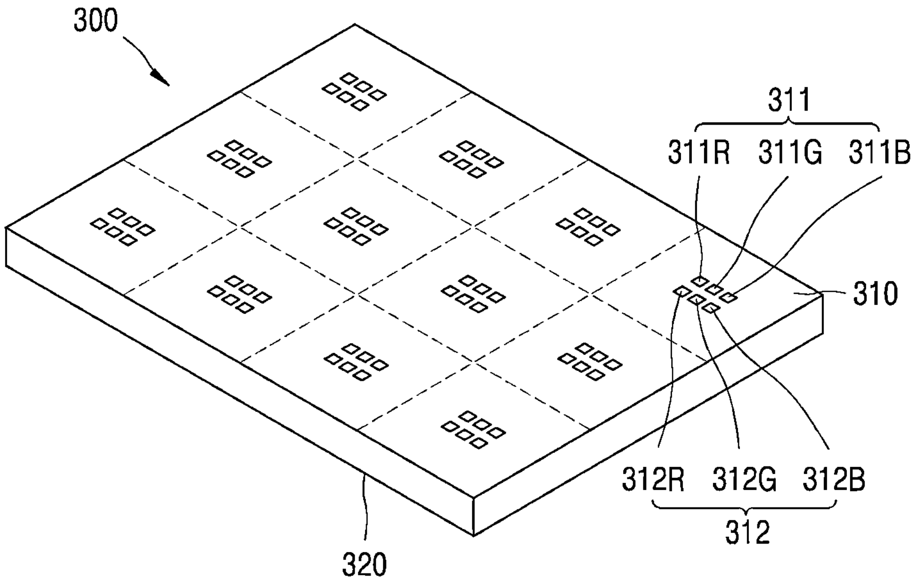
FIG. 3 is a perspective diagram schematically showing a display panel of a micro-LED display device according to an embodiment of the present disclosure.

FIG. 3 is a perspective view schematically illustrating a display panel of a micro-LED display device according to an embodiment of the present disclosure.

Referring to FIG. 3, a display panel 300 of the micro-LED display device 100 according to an embodiment of the present disclosure may include a substrate 320, and a plurality of first micro-LEDs 311 and a plurality of second micro-LEDs 312 mounted in a pixel area 310 and on the substrate 320.

According to one embodiment, the substrate 320 may be made of a transparent material such as glass, and a plurality of pixel areas 310 may be formed thereon. Although not shown in the drawing, the substrate 320 may be a TFT array substrate. For example, a thin-film transistor and various wirings for driving each of the first micro-LED 311 and the second micro-LED 312 may be formed in the pixel area 310 and in an upper surface of the TFT array substrate. When the thin-film transistor is turned on, a driving signal input thereto from an external source through the wiring is applied to the first micro-LED 311 or the second micro-LED 312, thereby causing the first micro-LED 311 or the second micro-LED 312 to emit light, thereby generating an image.

According to one embodiment, the first micro-LEDs 311 disposed in the pixel area 310 may include R, G, and B micro-LEDs 311R, 311G, and 311B. The second micro-LEDs 312 disposed in the pixel area 310 may include R, G, B micro-LEDs 312R, 312G, and 312B.

According to one embodiment, the first micro-LED 311 is a main light-emitting micro-LED. When a signal is applied from the external source to the R, G, and B micro-LEDs 311R, 311G, and 311B, the micro-LEDs 311R, 311G, and 311B may emit light beams of red (R), green (G), blue (B) colors, respectively to display an image.

Furthermore, the second micro-LED 312 acts as a redundancy micro-LED, and may operate instead of the first micro-LED 311 when a defect occurs in the first micro-LED 311 of a specific pixel. Although not shown in the drawing, a gate line, a data line, and a thin-film transistor for operating the first micro-LED 311 may be formed, and a redundant gate line, a redundant data line, and a redundant thin-film transistor for driving the second micro-LED 312 may be formed in the pixel area 310 of the (micro-LED) display panel 300. In other words, the first micro-LED 311 and the second micro-LED 312 may operate separately using different thin-film transistors respectively driven based on signals input through different paths.

According to one embodiment, the first micro-LED 311 and the second micro-LED 312 may be formed to have the same structure and may have the same optical and electrical characteristics. In addition, the first micro-LED 311 and the second micro-LED 312 may be manufactured in a process separate from a TFT array process of the substrate 320. In a typical organic electroluminescent display device, both the TFT array and the organic light-emitting layer are formed in a photo process. However, in the micro-LED display device of the present disclosure, the thin-film transistors and various wirings disposed on the substrate 320 may be formed in a photo process, but the first micro-LED 311 and the second micro-LED 312 may be manufactured in a separate process. Then, the separately manufactured first micro-LED 311 and second micro-LED 312 may be transferred onto the substrate 320. Thus, the micro-LED display device may be manufactured.

In this way, in the micro-LED display device of the present disclosure, the first micro-LED 311 and the second micro-LED 312 as the redundancy micro-LED are arranged in one pixel area 310, for following reasons.

In the micro-LED display device, the micro-LEDs 311 and 312 may be manufactured in the separate process from the TFT array process of the substrate 320 and then transferred to the substrate 320. Therefore, when a defect occurs in the micro-LED (e.g., the first micro-LED 311) in the transfer process, it may be difficult to repair the defective micro-LED (e.g., the first micro-LED 311). The micro-LED (e.g., the first micro-LED 311) at a specific point where the defect occurs may be exchanged with a normal micro-LED. However, it may be practically impossible to remove the micro-LED (e.g., the first micro-LED 311) of a micro size from the display panel 300 and transfer another micro-LED (e.g., the second micro-LED 312) to the specific point from which the micro-LED (e.g., the first micro-LED 311) has been removed.

Therefore, in accordance with the present disclosure, the redundancy micro-LED (e.g., the second micro-LED 312) is provided separately from the main light-emitting micro-LED (e.g., the first micro-LED 311). Thus, when a defect occurs in the main light-emitting micro-LED (e.g., the first micro-LED 311), a signal is not applied to the defective micro-LED (e.g., the first micro-LED 311), while a signal is applied to the corresponding redundancy micro-LED (e.g., the second micro-LED 312), thereby preventing or at least reducing a deterioration in image quality caused by the defective micro-LED (e.g., the first micro-LED 311).

Each of the micro-LEDs 311 and 312 may be an LED having a size in a range of 10 to 100 μm, and may be formed by growing multiple thin films made of inorganic materials such as Al, Ga, N, P, As, and In on a sapphire substrate or a silicon substrate, and then cutting and separating the sapphire substrate or the silicon substrate into LEDs. In this way, each of the micro-LEDs 311 and 312 has a microscopic size, and thus, may be transferred to a flexible substrate such as a plastic substrate, thereby enabling the production of a flexible display device. Furthermore, each of the micro-LEDs 311 and 312 is formed by growing an inorganic material into a thin film, which is not the case for an organic light-emitting layer. Thus, the manufacturing process thereof may be simple and a yield thereof may be improved. In addition, since the individually separated micro-LEDs 311 and 312 are simply transferred onto a large-area substrate 320, the production of a large-area display device becomes possible. Furthermore, each of the micro-LEDs 311 and 312 made of the inorganic material has the advantages of high luminance, long lifespan, and low unit price, compared to the LED made of the organic light-emitting material.

Figure 4:
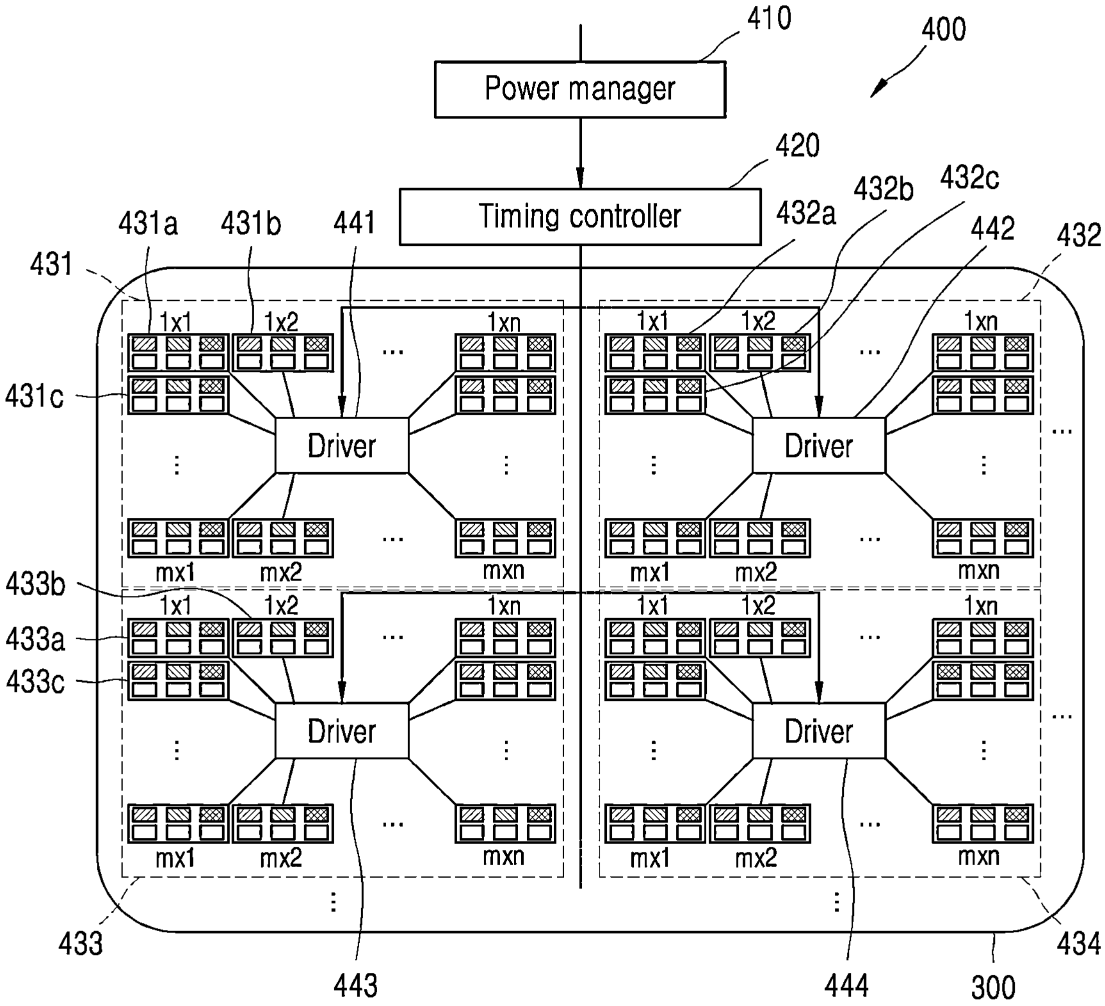
FIG. 4 is an example diagram showing a display panel of a micro-LED display device according to an embodiment of the present disclosure.

FIG. 4 is an example diagram showing a display panel of a micro-LED display device according to an embodiment of the present disclosure.

Referring to FIG. 3 and FIG. 4, a micro-LED display device 400 according to an embodiment of the present disclosure may include a power manager 410, a timing controller 420, and a display panel 300.

The configuration of the micro-LED display device 400 illustrated in FIG. 4 is based on an embodiment, and the components of the micro-LED display device 400 are not limited to the embodiment as illustrated in FIG. 4, and some components may be added, changed, or deleted as needed.

According to an embodiment, the power manager 410 may generate a DC power required to drive the display panel 300 using a DC-DC converter. The power manager 410 may receive a DC input voltage applied from a host system (not illustrated) and generate a DC voltage such as a gate-on voltage, a gate-off voltage, a high-potential driving voltage, and a low-potential driving voltage based on the received DC input voltage. The gate-on voltage and the gate-off voltage are supplied to the level shifter (not shown) and the drivers (e.g., drivers 441, 442, 443, and 444). The high-potential driving voltage and the low-potential driving voltage are supplied commonly to the pixels.

According to one embodiment, the host system (not shown) transmits input image data to the timing controller 420. The host system (not shown) may analyze the input image data to generate frame frequency information based on the image content, and transmit the frame frequency information to the timing controller 420.

In an example, the frame frequency information may be 120 Hz, 60 Hz, 48 Hz, 30 Hz, or 24 Hz. 120 Hz is the default frame frequency, and may be applied, for example, when a user moves the screen through touch drag, scrolls an Internet web page, draws a picture through a pen touch, or take a picture using a slow motion camera. 60 Hz may be applied when playing a game or a video. 48 Hz may be applied when playing a 48 Hz video. 30 Hz may be applied when playing a general Internet video, or when taking a picture with a camera or playing filmed video. Further, 24 Hz may be applied when playing a 24 Hz video, or playing a still image such as a background screen or a web page.

According to one embodiment, the timing controller 420 may process image data RGB input from the external source so as to be adapted to the size and the resolution of the display panel 300 and supply the processed image data to the drivers 441, 442, 443, and 444 disposed in the pixel areas 431, 432, 433, and 434, respectively. The timing controller 420 may generate a control signal that controls the operation of each driver using externally input synchronization signals, for example, a dot clock signal, a data enable signal, a horizontal synchronization signal, and a vertical synchronization signal. Further, the timing controller 420 may supply the generated control signal to each driver (e.g., the first driver 441) disposed in each pixel area (e.g., the first pixel area 431).

According to one embodiment, the display panel 300 may be divided into a plurality of pixel areas 431, 432, 433, and 434. Further, the plurality of pixels are disposed in each pixel area. For example, a plurality of pixels 431*a*, 431*b*, 431*c*, . . . are arranged in the first pixel area 431, and a plurality of pixels 432*a*, 432*b*, 432*c*, . . . are arranged in the second pixel area 432, a plurality of pixels 433*a*, 433*b*, 433*c*, . . . are arranged in the third pixel area 433, and so on.

Each pixel may include a plurality of sub-pixels (e.g., a red sub-pixel, a green sub-pixel, a blue sub-pixel). For example, pixels are arranged in an m×n array in each pixel area (e.g., the first pixel area 431). A driver (e.g., a first driver 441) may control an operation of each of the pixels (e.g., pixels arranged in an m×n array in the pixel area (e.g., the first pixel area 431)). Here, m and n may be natural numbers greater than zero, respectively.

To this end, each driver may be disposed in a corresponding pixel area.

Likewise, the plurality of pixels 432*a*, 432*b*, 432*c*, . . . are arranged in the second pixel area 432. A driver (e.g., the second driver 442) may control an operation of each of pixels (e.g., pixels arranged in an m×n array in the pixel area (e.g., the second pixel area 432)).

Further, as briefly illustrated in FIG. 4, a plurality of pixel rows may be provided in the display panel 430. Each pixel row may be composed of a plurality of pixels and a plurality of signal lines. The "pixel row" as described in the present disclosure may not mean a physical signal line, but rather, a collection of pixels and signal lines adjacent to each other along the extension direction of the gate line. The signal lines may include data lines for supplying display data voltage and sensing data voltage to the pixels, reference voltage lines for supplying pixel reference voltage to the pixels, gate lines for supplying gate signals to the pixels, and high-potential power lines for supplying the high-potential pixel voltages to the pixels.

According to one embodiment, the pixels of the display panel 300 may be arranged in a matrix form to form a pixel array. Each of the pixels included in the pixel array may be connected to one of the data lines, one of the reference voltage lines, one of the high-potential power lines, and one of the gate lines. Each of the pixels included in the pixel array may be connected to a plurality of gate lines. In addition, each of the pixels included in the pixel array may further receive a low-potential pixel voltage from the power manager 410. The power manager 410 may supply the low-potential pixel voltage to the pixel.

Each pixel may include a light-emitting element, a driving element, at least one switching element, and a storage capacitor. However, the present disclosure is not limited thereto.

According to one embodiment, each of the drivers 441, 442, 443, and 444 may perform at least one operation or function performed by each of the data driver 120 and the gate driver 141 and 142 of FIG. 1.

For example, each of the drivers 441, 442, 443, and 444 is connected to a plurality of data lines DL provided in each pixel area. These drivers 441, 442, 443, and 444 may convert the pixel-specific data signal into an analog pixel-specific data voltage using the pixel-specific data signal and the data control signal and a plurality of reference gamma voltages provided from the timing controller 420 and supply the converted pixel-specific data voltage to the corresponding data line.

Furthermore, each of the drivers 441, 442, 443, and 444 may control the operation of the plurality of pixels arranged in the corresponding pixel area based on the control signal provided from the timing controller 420.

Figure 5:
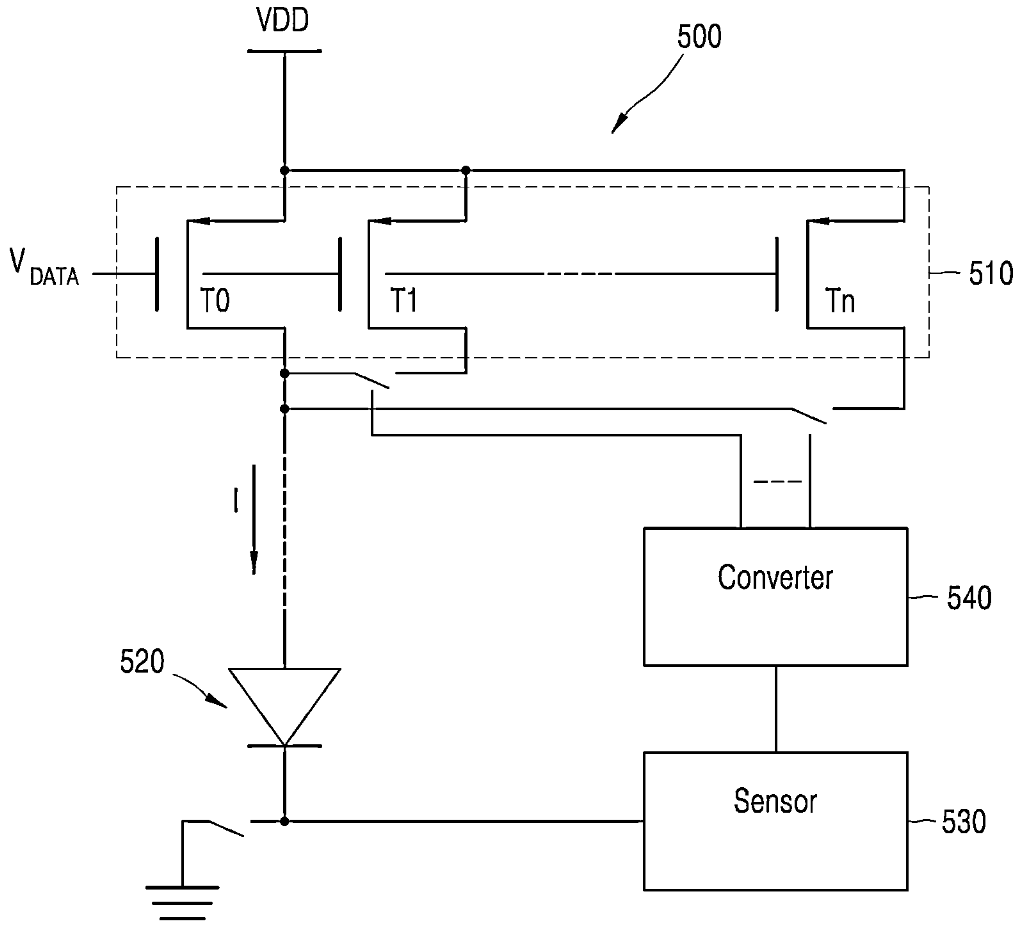
FIG. 5 is a schematic diagram showing a sub-pixel circuit configuration of a micro-LED display device according to an embodiment of the present disclosure.
Figure 6:
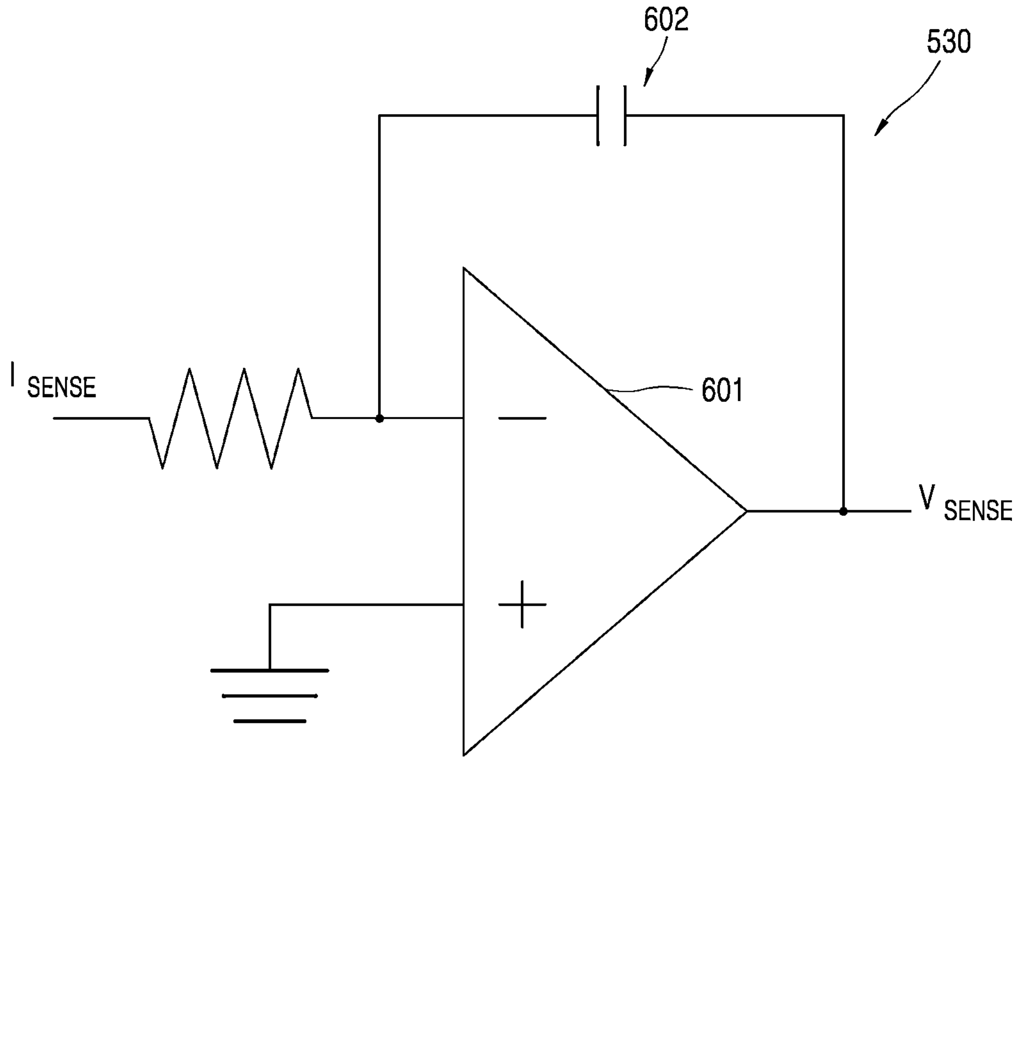
FIG. 6 is an example diagram showing a circuit diagram of a sensor of a micro-LED display device according to an embodiment of the present disclosure.

FIG. 5 is a schematic diagram showing a sub-pixel circuit configuration of a micro-LED display device according to an embodiment of the present disclosure. FIG. 6 is an example diagram showing a circuit diagram of a sensor of a micro-LED display device according to an embodiment of the present disclosure.

Referring to FIG. 5 and FIG. 6, a sub-pixel circuit 500 of a micro-LED display device according to an embodiment of the present disclosure may include a transistor array 510 including a plurality of driving transistors, a light-emitting element (e.g., LED 520) connected to and disposed between each of the driving transistors in the transistor array 510 and a low-potential voltage source and equivalently expressed as a diode, a sensor 530 that detects a current output through the LED in the pixel (e.g., the sub-pixel) and converts the detected current into a voltage, and a converter 540 (e.g., an AD (analog to digital) converter) that converts the converted voltage into a digital voltage. As an example implementation, the sensor 530 and the converter 540 may be included in a driver (e.g., the first driver 441) shown in FIG. 4.

According to one embodiment, each sub-pixel may include a driving transistor T0, T1, . . . , Tn connected to each gate line, each data line, each initialization power line, each light emission control line, and each high-potential voltage source, and a micro-LED 520 connected to and disposed between the driving transistors T0, T1, . . . , Tn and the low-potential voltage source and equivalently expressed as a diode. Here, n may be a natural number greater than zero.

Furthermore, each sub-pixel may include a plurality of switching transistors and a storage capacitor.

According to one embodiment, each of the driving transistors T0, T1, . . . , Tn is turned ON based on a data signal applied to the gate electrode thereof. As a result, a current proportional to the data signal flows to the micro-LED 520 through each of the driving transistors T0, T1, . . . , and Tn. Thus, the micro-LED 520 emits light at a luminance proportional to the current flowing through each of the driving transistors T0, T1, . . . , Tn.

According to one embodiment, the transistor array 510 may include the plurality of driving transistors T0, T1, . . . , Tn. Each of the plurality of driving transistors T0, T1, . . . , Tn in the transistor array 510 may be a P type thin-film transistor or an N type thin-film transistor. Each of these plurality of driving transistors T0, T1, . . . , Tn may control a current I flowing in the micro-LED 520.

For example, the same voltage VDD is applied to each of the drain terminals of the plurality of driving transistors T0, T1, . . . , Tn. The gate terminal of each of the plurality of driving transistors T0, T1, . . . , Tn are connected to each other. The source terminals of the plurality of driving transistors T0, T1, . . . , Tn are connected to the anode terminal of the micro-LED 520.

According to one embodiment, the sub-pixel circuit 500 may be changed into various structures to perform internal compensation or external compensation. Furthermore, the sub-pixel circuit 500 may be changed in various ways to drive the micro-LED display device 400.

The external compensation means that calculates an amount of change in the threshold voltage or mobility of the driving transistor formed in the sub-pixel and varies the magnitude of the data voltage VDATA supplied to the sub-pixel based on the amount of change. Therefore, the structure of the pixel may be changed in various forms so that the amount of change in the threshold voltage or mobility of the driving transistor may be calculated.

The internal compensation means prevents the current transmitted to the light-emitting element from the driving transistor in the pixel from being affected by the threshold voltage of the driving transistor. To this end, the structure and driving scheme of the pixel may be changed in various forms so that the threshold voltage may be removed in the current calculation formula as described above.

According to one embodiment, the sensor 530 detects the current output through the micro-LED 520 and converts the detected current into voltage. The sensor 530 outputs a voltage proportional to the detected current.

The sensor 530 is composed of an operational amplifier 601 and a capacitor 602. The detected current ISENSE is input to a first terminal (e.g., – terminal) of the operational amplifier 601, and a second terminal (e.g., + terminal) thereof is grounded. The sensor 530 converts the current into voltage through the operational amplifier 601 to measure a weak current flowing through the driving transistor.

Thereafter, the sensor 530 transmits the converted voltage VSENSE to the converter 540.

According to one embodiment, the converter 540 may control ON/OFF of at least one driving transistor in the transistor array 510, based on the voltage VSENSE transmitted from the sensor 530 under the control of the driver (e.g., the first driver 441).

According to one embodiment, the driver (e.g., the first driver 441) may control ON/OFF of at least one driving transistor in the transistor array 510, based on the digital voltage into which the converter 540 has converted the analog voltage. The driver (e.g., the first driver 441) may select the number of at least one driving transistor in the transistor array 510 (i.e., control a width) to compensate for the difference between the respective currents of the pixels.

The driver (e.g., the first driver 441) may control the ON/OFF of at least one driving transistor in the transistor array 510 so that the current value flowing to the micro-LED 520 of the pixel (e.g., the first sub-pixel) corresponds to (or is equal to) the current value flowing to the micro-LED of the pixel (e.g., a second sub-pixel) adjacent thereto. The current value flowing to the micro-LED in each sub-pixel may vary depending on the mobility of the driving transistor. This current variation makes it difficult to accurately compensate for the difference when the display device operates at the low voltage level at which the driving transistor operates in the subthreshold region, and furthermore, the difference between the mobilities of the driving transistors in each pixel cannot be compensated for.

In accordance with the present disclosure, the plurality of driving transistors may be disposed in the pixel, and the ON/OFF of at least one driving transistor among the plurality of driving transistors may be controlled so that the current value flowing to the LED through the driving transistor of the corresponding pixel is equal to the current value flowing to the LED through the driving transistor of a pixel adjacent thereto. Thus, the accurate compensation for the difference between the currents of the pixels may be performed when the display device operates at a low voltage level at which the driving transistor operates in the subthreshold region. Furthermore, the compensation for the difference between the mobilities of the driving transistors of each pixel may be achieved.

The driver (e.g., the first driver 441) may select at least one driving transistor to be turned ON/OFF, based on the mobility of each driving transistor. Further, the driver (e.g., the first driver 441) may control the ON/OFF of the selected at least one driving transistor so that the current value flowing to the LED through the driving transistor of the corresponding pixel is equal to the current value flowing to the LED through the driving transistor of a pixel adjacent thereto.

Figure 7:
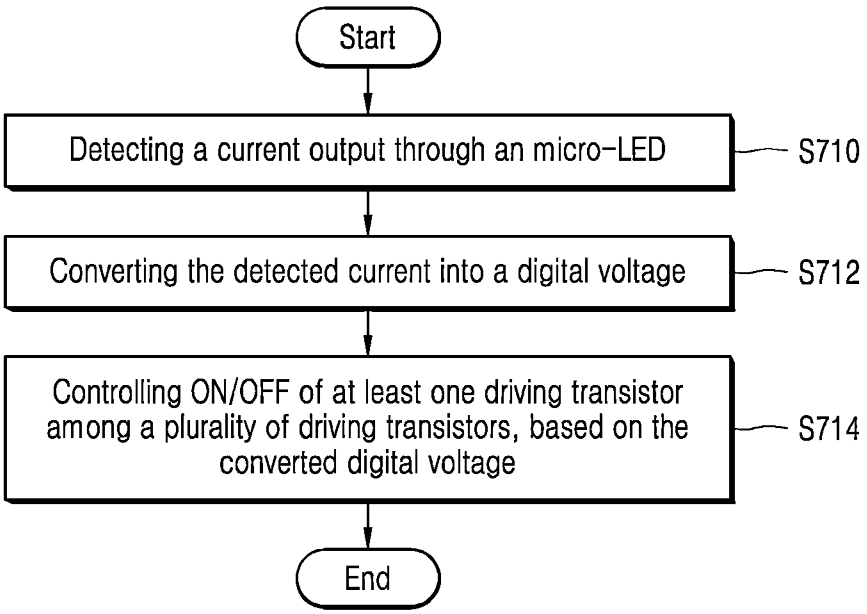
FIG. 7 is a flowchart showing a pixel current compensation method of a micro-LED display device according to an embodiment of the present disclosure.

FIG. 7 is a flowchart showing a pixel current compensation method in a micro-LED display device according to an embodiment of the present disclosure.

Hereinafter, referring to FIG. 7, a pixel current compensation method in a micro-LED display device according to an embodiment of the present disclosure is described in detail as follows.

According to an embodiment, the driver may detect a current flowing to the micro-LED in S710. The driver (e.g., the first driver 441) may detect the current ISENSE flowing to the micro-LED 520 through at least one driving transistor in the transistor array 510 using the sensor 530 based on the above [Mathematical Formula 1], and identify an intensity of the detected current. For example, the driver may identify at least one driving transistor that transmits the current to the LED in an ON state thereof, and may identify the mobility of the identified at least one driving transistor.

According to an embodiment, the driver may convert the detected current into a digital voltage in S712. Using the converter 540, the driver (e.g., the first driver 441) may convert the current detected by the sensor 530 into the voltage for controlling the ON/OFF of each of the driving transistors of the transistor array 510.

According to one embodiment, the driver may control the ON/OFF of at least one driving transistor among the plurality of driving transistors based on the converted digital voltage in S714. A switch (not shown) may be disposed between the converter 540 and each of the driving transistors (e.g., the source terminal of each of the driving transistors) in the transistor array 510. The driver (e.g., the first driver 441) may control the ON/OFF of the at least one driving transistor to compensate for the difference between the current of the driving transistor (e.g., the first driving transistor in the pixel (e.g., the first sub-pixel) and the current of the driving transistor (e.g., the second driving transistor) in the pixel (e.g., the second sub-pixel) adjacent thereto. In this regard, the ON/OFF control of the at least one driving transistor is performed via the ON/OFF of the switch.

The driver (e.g., the first driver 441) may compensate for the difference between the current of the driving transistor (e.g., the first driving transistor) of the corresponding pixel and the current of the driving transistor (e.g., the second driving transistor) of the pixel adjacent thereto, based on the mobility of each of the driving transistors (e.g., the first driving transistor) in the transistor array 510 (for example, the mobilities of the driving transistors in the transistor array are different from each other).

To this end, the driver (e.g., the first driver 441) may increase the number of driving transistors that are turned ON among the plurality of driving transistors as the intensity of the current output through the micro-LED 520 is lower.

Alternatively, the driver (e.g., the first driver 441) may decrease the number of driving transistors that are turned ON among the plurality of driving transistors as the intensity of the current output through the micro-LED 520 is greater.

The number of driving transistors which are turned ON may be determined so that the intensity of the current output through the micro-LED 520 in the corresponding pixel is equal to the intensity of the current flowing to the micro-LED in the adjacent pixel thereto.

In this way, the driver (e.g., the first driver 441) may detect the intensity of the current passing through the at least one driving transistor included in each of the plurality of pixels in the pixel area, and may compensate for a current based on the difference between the mobilities of the driving transistors in each pixel, based on the detection result.

Although some embodiments of the present disclosure have been described above with reference to the accompanying drawings, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or essential features of the present disclosure. Therefore, it should be understood that some embodiments as described above are not restrictive but illustrative in all respects.

What is claimed is:

1. A micro-LED (light-emitting diode) display device comprising:

a display panel including a plurality of pixel areas and a driver disposed in each of the plurality of pixel areas that is configured to control an operation of a plurality of pixels disposed in each of the plurality of pixel areas, wherein each pixel has a plurality of driving transistors and an LED, wherein gate terminals of the plurality of driving transistors are connected to each other, drain terminals of the plurality of driving transistors are connected to each other, a source terminal of any one of the plurality of driving transistors is directly connected to an anode terminal of the LED, and source terminals of remaining driving transistors are connected to the anode terminal of the LED through switches; and wherein the driver comprises:

a sensor configured to be connected to a cathode terminal of the LED and detect a current of the LED and convert the detected current into a sensing voltage; and an analog-to-digital converter configured to generate a switch control signal based on the sensing voltage and supply the switch control signal to the switches, wherein a number of switches that are turned on is determined by the switch control signal configured driver.

2. The micro-LED display device of claim 1, further comprising a timing controller configured to control an operation of the driver disposed in each of the plurality of pixel areas, wherein the driver is configured to control an operation of the plurality of pixels disposed in each of the plurality of pixel areas under control of the timing controller.

3. The micro-LED display device of claim 1, wherein the driver is configured to control a number of driving transistors to be turned ON among the plurality of driving transistors according to the switch control signal.

4. The micro-LED display device of claim 3, wherein as an intensity of the current of the LED decreases, the driver is configured to increase the number of driving transistors to be turned ON among the plurality of driving transistors.

5. The micro-LED display device of claim 3, wherein as an intensity of the current of the LED increases, the driver is configured to decrease the number of driving transistors to be turned ON among the plurality of driving transistors.

6. The micro-LED display device of claim 3, wherein the driver is further configured to select the at least one driving transistor to be turned ON/OFF based on a mobility of each driving transistor of the plurality of driving transistors.

7. The micro-LED display device of claim 1, wherein the driver is further configured to:

detect an intensity of a current flowing through at least one driving transistor in each of the plurality of pixels in each of the plurality of pixel areas; and compensate for a current based on a difference between mobilities of driving transistors in each pixel based on the detection.

8. The micro-LED display device of claim 1, wherein each of the plurality of pixels disposed in each pixel area includes a first micro-LED and a second micro-LED that operates instead of the first micro-LED when a defect occurs in the first micro-LED of a specific pixel.

9. The micro-LED display device of claim 8, wherein each of the first micro-LED and the second micro-LED is formed by growing an inorganic material into a thin film and is transferred onto a substrate to form the micro-LED display device.

* * * * *